United States Patent
Kismarton et al.

(10) Patent No.: US 9,713,939 B2
(45) Date of Patent: Jul. 25, 2017

(54) COMPOSITE FIBER BICYCLE WHEELS

(71) Applicant: Cayucos Cowboys, LLC, San Luis Obispo, CA (US)

(72) Inventors: Max U. Kismarton, Renton, WA (US); Eric Hjertberg, Seattle, WA (US); G. Kyle Lobisser, Seattle, WA (US)

(73) Assignee: Cayucos Cowboys, LLC, San Luis Obispo, CA (US)

( * ) Notice: Subject to any disclaimer, the term of this patent is extended or adjusted under 35 U.S.C. 154(b) by 0 days.

(21) Appl. No.: 15/011,767

(22) Filed: Feb. 1, 2016

(65) Prior Publication Data

US 2016/0144658 A1    May 26, 2016

Related U.S. Application Data

(63) Continuation of application No. 13/738,904, filed on Jan. 10, 2013, now abandoned, which is a
(Continued)

(51) Int. Cl.
*B60B 5/00* (2006.01)
*B60B 5/02* (2006.01)
(Continued)

(52) U.S. Cl.
CPC .............. *B60B 5/00* (2013.01); *B29C 70/30* (2013.01); *B32B 37/02* (2013.01); *B60B 1/003* (2013.01); *B60B 1/041* (2013.01); *B60B 1/043* (2013.01); *B60B 5/02* (2013.01); *B60B 21/062* (2013.01); *B29L 2031/32* (2013.01); *B60B 2310/211* (2013.01); *B60B 2310/226* (2013.01); *B60B 2310/242* (2013.01); *B60B 2310/318* (2013.01); *B60B 2360/344* (2013.01); *B60B 2360/3416* (2013.01); *B60B 2900/111* (2013.01); *B60B 2900/112* (2013.01); *B60B 2900/115* (2013.01); *Y10T 29/49522* (2015.01); *Y10T 156/1062* (2015.01)

(58) Field of Classification Search
CPC .. B60B 1/00; B60B 1/003; B60B 1/02; B60B 1/0246; B60B 1/04; B60B 1/042; B60B 1/043; B60B 5/00; B60B 5/02; B60B 21/062
USPC .............. 301/55–56, 58–59, 67, 74, 104
See application file for complete search history.

(56) References Cited

U.S. PATENT DOCUMENTS

| | | | |
|---|---|---|---|
| 6,231,128 B1* | 5/2001 | Okajima | B60B 1/0223 301/104 |
| 2007/0063574 A1* | 3/2007 | Mercat | B60B 1/0207 301/55 |

(Continued)

*Primary Examiner* — Jason Bellinger
(74) *Attorney, Agent, or Firm* — Pillsbury Winthrop Shaw Pittman LLP

(57) ABSTRACT

Carbon fiber bicycle wheels are formed from parts cut from carbon fiber cloth and then joined together to form a rim, sidewalls, spokes, flanges and a center tunnel on which the flanges are mounted. The parts are then assembled, bonded together, and cured to form a wheel. During assembly, the spokes and the wheel are placed in tension by moving the flanges outwardly on the center tunnel after assembly and then bonding them in place to stiffen and strengthen the wheel. The spokes of the drive side of the rear wheel are specially shaped to accommodate torque transfer forces generated by pedaling.

8 Claims, 15 Drawing Sheets

Related U.S. Application Data continuation of application No. 12/709,178, filed on Feb. 19, 2010, now abandoned.

(60) Provisional application No. 61/216,977, filed on May 26, 2009.

(51) Int. Cl.
| | | |
|---|---|---|
| *B60B 21/06* | (2006.01) | |
| *B32B 37/02* | (2006.01) | |
| *B60B 1/00* | (2006.01) | |
| *B29C 70/30* | (2006.01) | |
| *B60B 1/04* | (2006.01) | |
| *B29L 31/32* | (2006.01) | |

(56) References Cited

U.S. PATENT DOCUMENTS

| | | | |
|---|---|---|---|
| 2007/0194619 A1* | 8/2007 | Colegrove | B60B 5/02 301/95.101 |
| 2007/0205654 A1* | 9/2007 | Denk | B60B 5/02 301/95.102 |
| 2008/0106141 A1* | 5/2008 | Muraoka | B60B 1/041 301/58 |
| 2008/0191543 A1* | 8/2008 | Saillet | B60B 1/0261 301/55 |
| 2008/0265659 A1* | 10/2008 | Heyse | B29C 70/342 301/104 |
| 2009/0152938 A1* | 6/2009 | Tsai | B60B 1/003 301/55 |
| 2010/0301663 A1* | 12/2010 | Kismarton | B60B 5/02 301/64.704 |
| 2013/0214586 A1* | 8/2013 | Kismarton | B60B 5/02 301/58 |

* cited by examiner

COMPOSITE FIBER BICYCLE WHEELS

CROSS-REFERENCE TO RELATED APPLICATION

This application is a continuation of U.S. application Ser. No. 13/738,904, filed Jan. 10, 2013, which is a continuation application of U.S. application Ser. No. 12/709,178, filed Feb. 19, 2010, which claims priority to U.S. Provisional Application No. 61/216,977, filed May 26, 2009, all of which applications are expressly incorporated herein by reference in their entirety.

BACKGROUND

Composite bicycle wheels are known, but have typically been made by molding the wheel as a single piece or molding parts thereof and then mechanically assembling the molded parts to form a wheel. Two piece wheels are known where each half comprises a rim, spokes and a hub, the two halves being bonded together. Wheels formed of composite portions and metal portions are also known. Wheels are known having spokes formed of composite fiber windings. In most instances the spokes of the composite wheels are of large diameter while in some cases the entire central portion of the wheel is formed as a single piece. All of the known processes for forming composite wheels are complex and costly and produce wheels which are heavier than wheels produced in accordance with the present invention.

SUMMARY

This Summary is provided to introduce (in a simplified form) a selection of concepts that are further described below in the Detailed Description. This Summary is not intended to identify key features of the claimed subject matter, nor is it intended to be used as an aid in determining the scope of the claimed subject matter.

In view of the difficulty in manufacturing known composite bicycle wheels, their cost to produce and their weight, the inventors of the present application have devised an improved method of making novel carbon fiber bicycle wheels. The method economically produces carbon fiber bicycle wheels which are lighter and more aerodynamic than known wheels, while also being strong and durable.

In accordance with one embodiment of the invention, all parts of the wheel are formed from carbon fiber. The various pieces of the bicycle wheel comprising a rim, sidewalls, spokes, central flanges to which the spokes are attached, and a center tunnel on which the flanges are mounted, are all formed from pieces which are cut from carbon fiber cloth or tape. The cut pieces are laid together and cured to form the various parts of the wheel and the parts are then bonded together in a selected order and cured to form a wheel. Tension is added to the spokes by sliding the flanges mounted on the center tunnel outward and then bonding them in place. The addition of spoke tension stiffens and strengthens the wheel.

Forming all parts of the wheel from simple shapes eliminates the need for complex and costly molding techniques as used in the prior art. In addition, the present process allows each of the parts to be formed so that the forces the parts encounter in the wheel during use are borne by longitudinally aligned carbon fibers. The tensile strength of the carbon fibers is thus used to counter the loads experienced by the wheels during use.

The described process allows for the manufacture of multiple varieties of rims and sidewalls and to join them in unique combinations to make different wheels to satisfy the needs of riders of various sizes and performance levels. Thus wheels of various degrees of stiffness, weight and durability may be made with the same tooling.

DESCRIPTION OF THE DRAWINGS

The foregoing aspects and many of the attendant advantages of this invention will become more readily appreciated as the same become better understood by reference to the following detailed description, taken in conjunction with the accompanying drawings, wherein.

DETAILED DESCRIPTION

Figure 1:
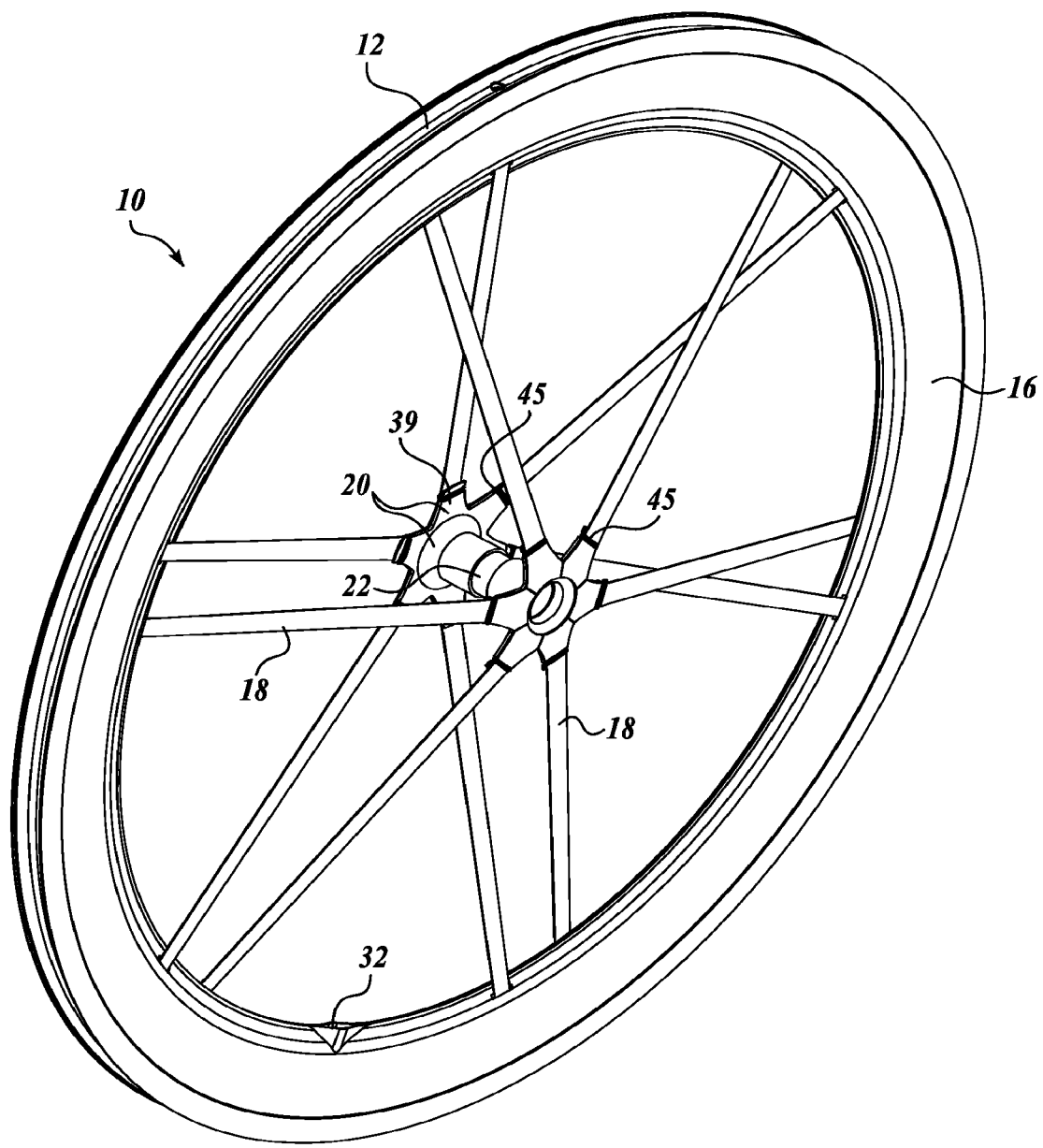
FIG. 1 is a perspective view of a front bicycle wheel made in accordance with the present invention.

In accordance with a first embodiment of the present invention, in FIG. 1, a carbon fiber front bicycle wheel 10 made in accordance with the present invention is illustrated. It will be understood that the front and rear bicycle wheels disclosed herein share the same fundamental design, a bonded structure made from simple shape carbon fiber components. However, some differences will be discussed relating to the rear wheel's need to handle the torque forces generated by pedaling.

Figure 2:
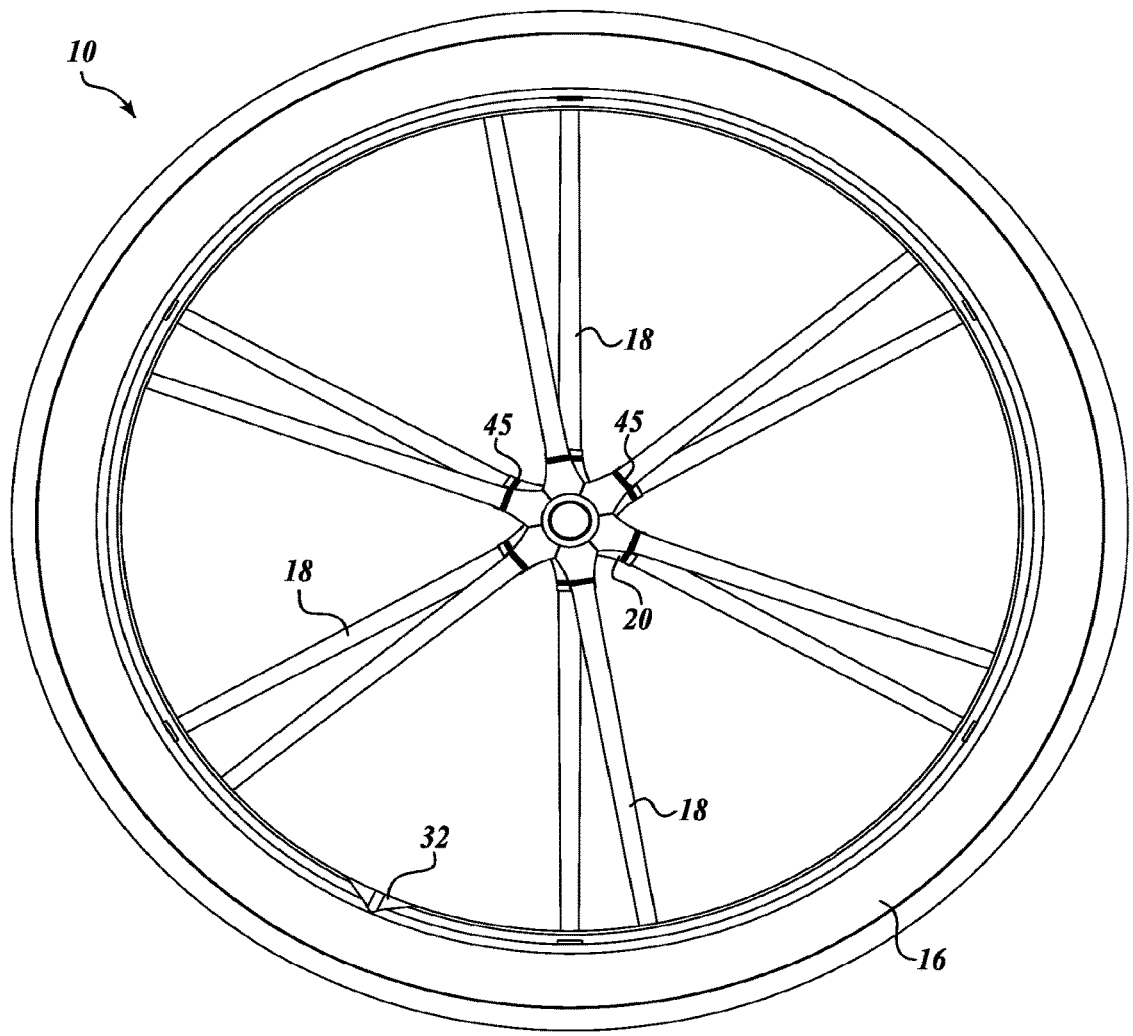
FIG. 2 is a side elevation view of the embodiment of FIG. 1.
Figure 3:
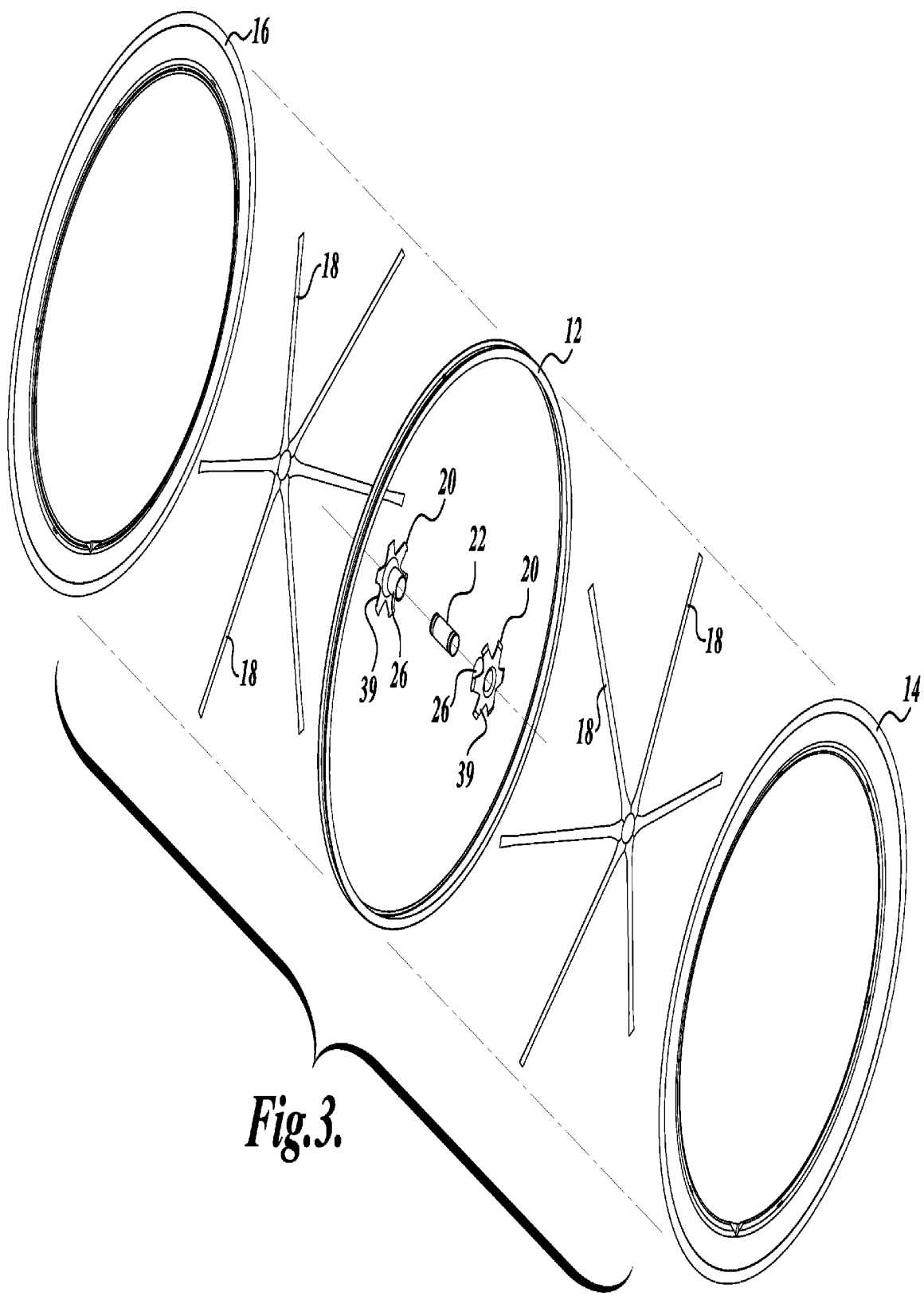
FIG. 3 is an exploded view of the bicycle wheel of FIG. 1.

Turning to FIGS. 1-3, it will be seen that bicycle wheel 10 is formed from a plurality of separate parts including a rim 12, right and left side sidewalls 14 and 16, spokes 18, flanges 20 to which the inward ends of the spokes are bonded, and central tunnel 22. Each of these separate parts are formed from pieces cut from carbon fiber cloth. In some cases, pieces of unidirectional carbon fiber tape are also used, the choice being governed by the shape of the part and the avoidance of waste of expensive carbon fiber material. For example, spokes may be cut from unidirectional carbon fiber tape, although it will be understood that the spokes may alternatively be cut from woven carbon fiber cloth. In some instances, the parts may be made from a combination of cloth and unidirectional tape, the selection of appropriate materials being well within the skill of a man skilled in the art of forming carbon fiber parts and, thus, aware of the great tensile strength of carbon fiber.

Figure 6:
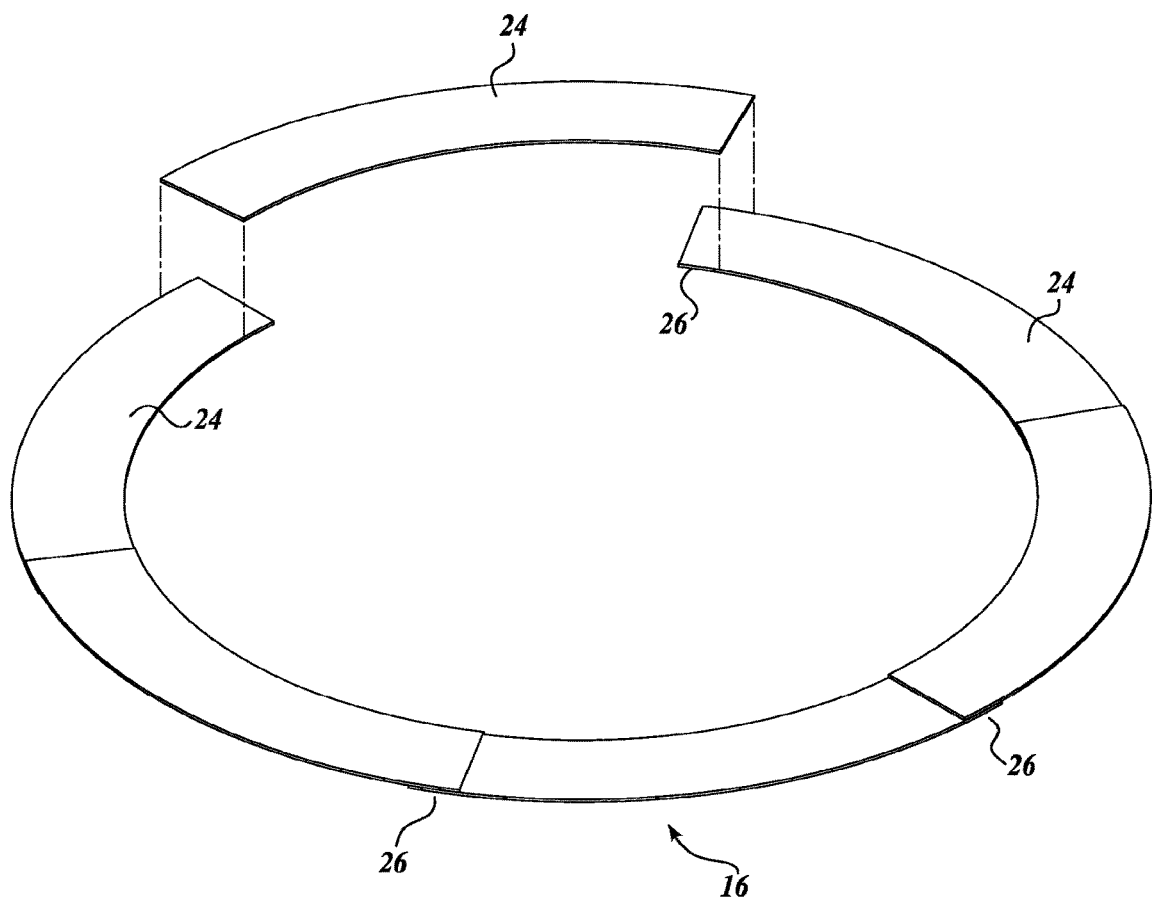
FIG. 6 is an exploded view of pieces of carbon fiber cloth being overlaid to form a sidewall.

Turning to FIG. 6, one method of forming the sidewalls is disclosed to comprise joining arcuate sections of carbon fiber cloth. To strengthen the wheel, the arcuate sections are cut from carbon fiber cloth such that a maximum number of carbon fibers run in a full end-to-end direction. Tangential to the center of each arc, these fibers form tendons that lock each arcuate section against flexing from an arcuate shape toward a rectangular shape during use. Accordingly, such placement of the carbon fibers increases the wheel's load bearing capacity.

As shown in FIG. 6, six arcuate sections 24 of carbon fiber cloth are joined and bonded in overlapping relationship to form a circular sidewall 16. Each of the sections 24 overlaps the adjacent sections to provide a large bonding area 26 for the placement of epoxy or other appropriate bonding material. It has been found that overlapping each section approximately one inch creates a strong bond between the sections and also provides a strong mounting area for the spokes 18.

In a preferred form, the joined and bonded sections are cured in a conventional tool that provides mechanical compression and pressure from thermally expanding rubber and a vacuum. It has been found that forming a sidewall from two layers of sections 24 provides a strong and durable sidewall. Preferably, the second layer of sections is clocked, approximately 30 degrees, from the first section so that the overlying joints are not disposed one on top of the other to prevent overly thickened sections on the sidewall. It has also been found that the second layer of arcuate sections need not overlap as great an amount as the sections of the first layer as described above. Overlapping joints 26 provide strong mounting points for the outer ends of spokes 18.

After bonding and curing of the sidewalls, their edges are trimmed and sanded before being joined to rim 12. It will be understood that unlike those found on other carbon composite wheels, the sidewalls of the present invention are load bearing, tensioned structures. This results in a more efficient, higher performing structure by reducing peak stresses where the spokes connect to the sidewalls. In some embodiments, the sidewalls may have a dedicated braking surface with a wear indicator such as a point covering. When worn, a new braking surface may be applied.

Figure 7:
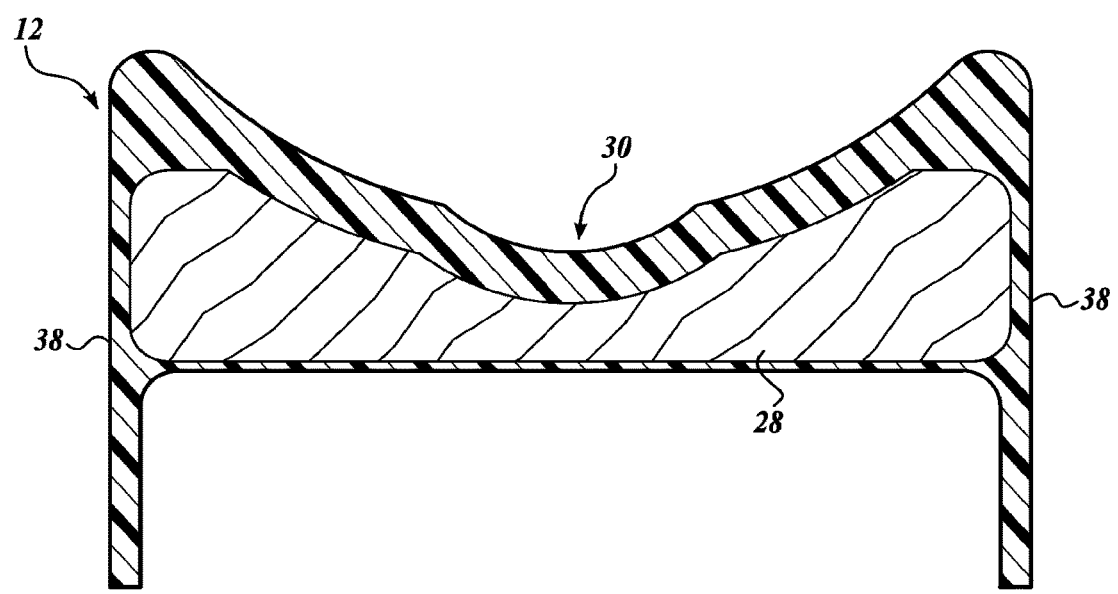
FIG. 7 is a cross-sectional view of the rim of a bicycle wheel made in accordance with the present invention.

Turning to FIG. 7, rim 12 is formed from laid up pieces of woven carbon fiber cloth and unidirectional tape which, in a preferred embodiment, surround a wood core 28. Wood core 28 is not a structural element, but rather acts as a spacer since wood is of lower density than carbon fiber and thus allows the wheel to be made lighter.

The rim is formed by placing the laid up pieces in a steel mold and then curing them in a conventional manner under heat and pressure. The formed rims are again finished by trimming with abrasive sanders and saws. The outer surface of the rim is formed in the shape of a channel 30 adapted to receive a conventional rubber tire. An opening 32 (FIG. 4) is provided to receive an inwardly directed air valve, through which the tire is inflated, running from the tire through the rim.

Flanges 20 (FIG. 3) may be formed using rectangles and disks of woven carbon fiber cloth which are assembled and bound by a wrap of unidirectional tape so that the carbon fibers are oriented such that many lie in a radial direction to support the high spoke tension connection of the present invention. Again, the laid up rectangles, disks, and tape are cured in conventional tools and then trimmed with abrasive sanders to remove rough edges.

Spokes 18 are preferably formed from a multilayer unidirectional sandwich of carbon fiber tape in which the fibers run lengthwise to carry high tension loads from the hub flange 20 to the sidewalls 16. This construction increases the tensile strength of the spoke to provide improved stiffness and performance. The flatness of the spokes reduces drag to levels atypical of spoked wheels. The spokes are cured under high mechanical and expanded rubber pressure and then cut to precise shape as illustrated in the drawings. The widened ends of the spokes 18 provide a large bonding surface.

Figure 4:
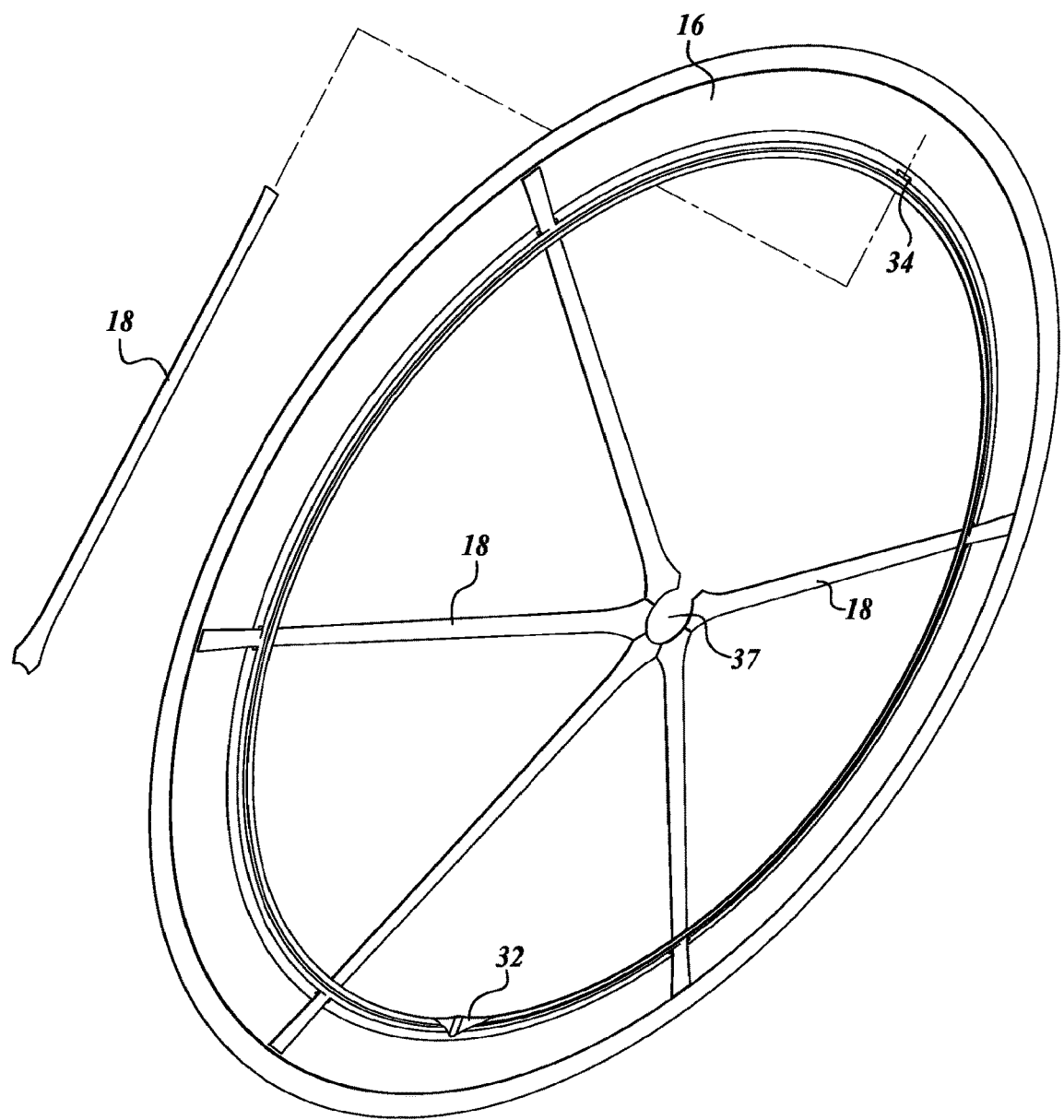
FIG. 4 is a perspective view of a sidewall of the bicycle wheel of FIG. 1 showing the mounting of spokes on the sidewall.
Figure 5:
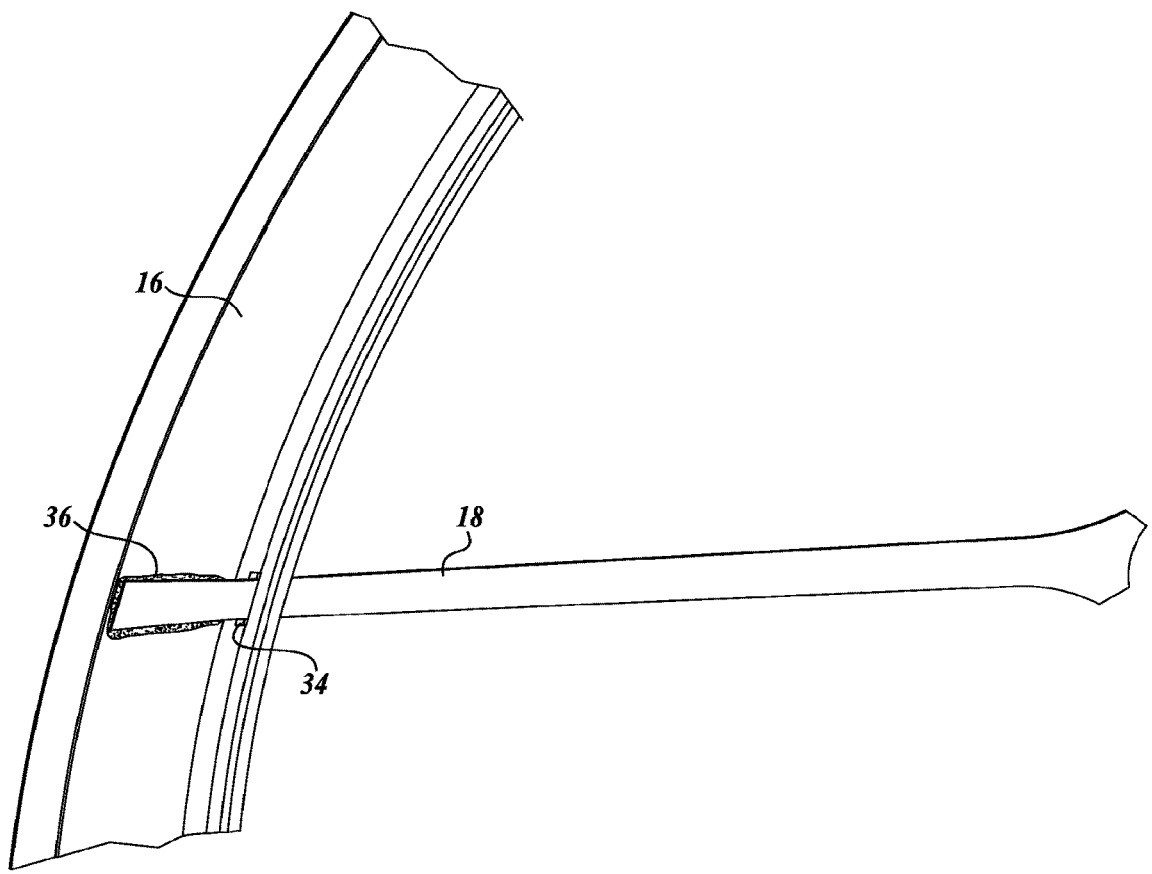
FIG. 5 is a section view of the sidewall of FIG. 4 showing the bonding of the spoke to the sidewall.

Turning, additionally, to FIGS. 4 and 5, the assembling of the parts of the wheel is carried out through a series of bonding procedures employing conventional tooling to ensure alignment, and high temperature and pressure. The first bond consists of bonding six spokes 18 to each sidewall 14 and 16 at locations 26 where the arcuate sections 24 of the sidewalls overlap. As discussed earlier, the spokes 18 are mounted at the overlapping joints 26 so that they can better support the high spoke tension loads imparted to the spokes as will be described hereafter. As shown in FIG. 5, the outer ends of the spokes 18 extend through slots 34 and are bonded to the inside of the sidewall using a conventional adhesive 36 such as epoxy. As best seen in the cross-section view of FIG. 14 with respect to the right rear wheel spokes, both sidewalls 14 and 16 include a circumferential profile change 15 at the location of the spoke insertion slots 34. This profile change allows slots 34 to be aimed toward the opposite side flange 20, while minimizing disruption to the sidewall surface thus improving both the strength and aerodynamics of the finished sidewall. As best seen in FIG. 4, the inner ends of spokes 18 are shaped such that their bottom edges adjoin each other to define a circular opening 37 when all are mounted in place on the outer surface of the sidewall 16.

After the spokes are bonded to the sidewalls, the two sidewalls 14 and 16 with attached spokes 18 are bonded to the lateral surfaces 38 of rim 12 and the bonds are cured in a conventional manner. The inner ends of the spokes 18 are then bonded to the outer surfaces of flanges 20 and cured. It will be understood that flanges 20 may be formed with short spoke mounting sections 39 extending outwardly therefrom, the material between these sections having been removed to reduce weight. See FIGS. 1 and 3.

Flanges 20 also include inwardly extending tubular portions 21 which are sized to receive central tunnel 22. When tunnel 22 is inserted through the flanges 20, the flanges come to rest at a first location. As will be discussed in greater detail hereafter with reference to FIGS. 15A and B, tension is added to the spokes 18 by moving the flanges 20 laterally apart a short distance. This process results in equally tensioned spokes, eliminates the need for trimming and reduces labor time and wheel cost. This process also allows the wheel to be easily customized for different types of riders without investing in new tooling since the spoke geometry, lay up and spoke tension level can be easily changed. In practice, it has been found that this lateral distance need be no more than a quarter of an inch or less, with further outward movement being limited by the resistance to longitudinal extension of the longitudinally extending carbon fibers of spokes 18. After the spokes are moved laterally outward, they are held in place by a conventional jig and bonded to tunnel 22 to maintain the induced tension in the spokes.

It will be understood that the described method of forming a wheel of a bicycle uses 100% carbon fiber cloth and tape to form all structural parts, and that the wheel is assembled from flat sections of this material solely by bonding and curing the parts together and without the requirement of molding any hollow element. The resulting wheel is both less costly to manufacture than known carbon fiber wheels and also produces a very strong and durable wheel due to the addition of the induced stress.

Figure 8:
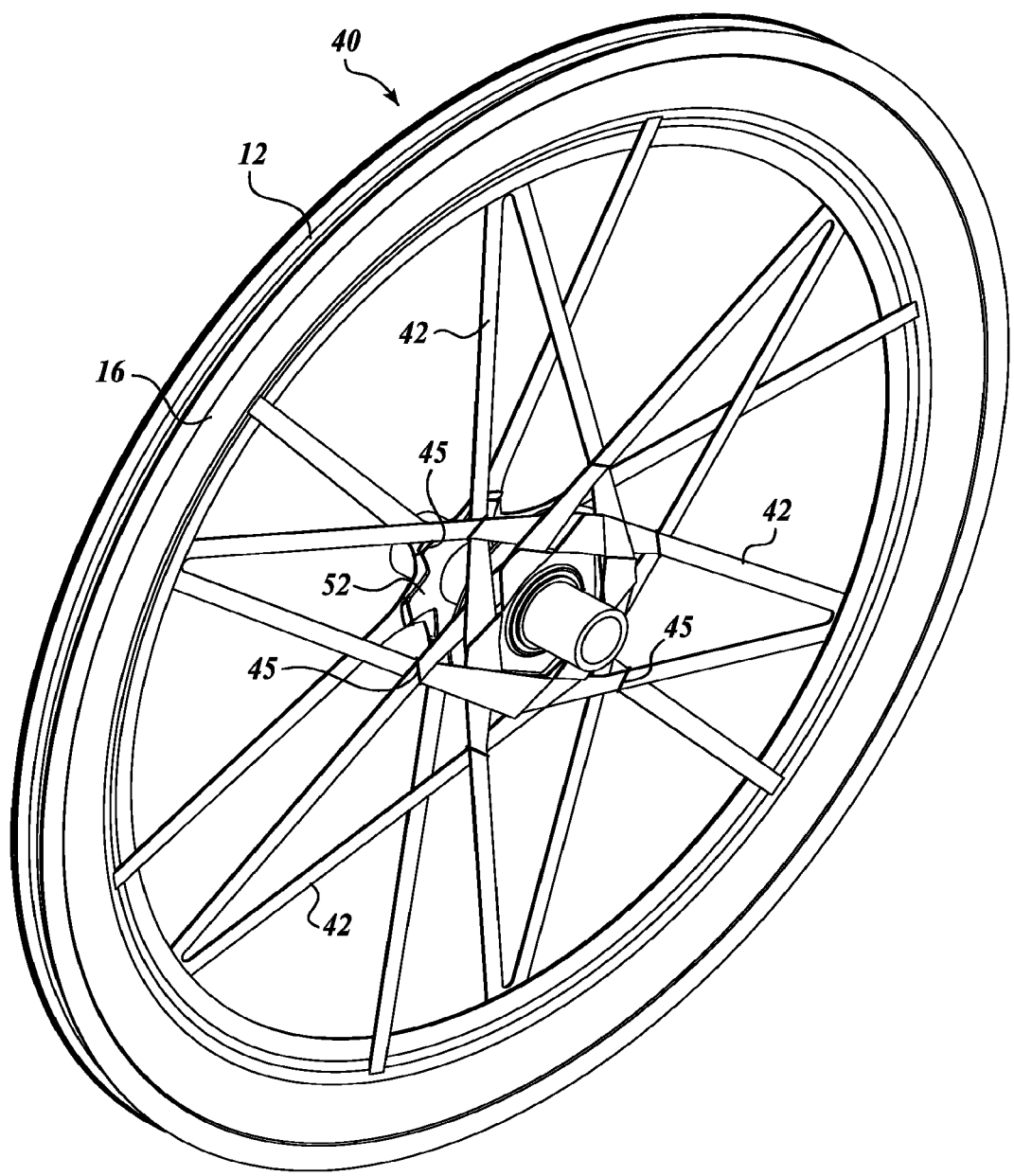
FIG. 8 is a right side perspective view of a rear bicycle wheel made in accordance with the present invention.
Figure 9:
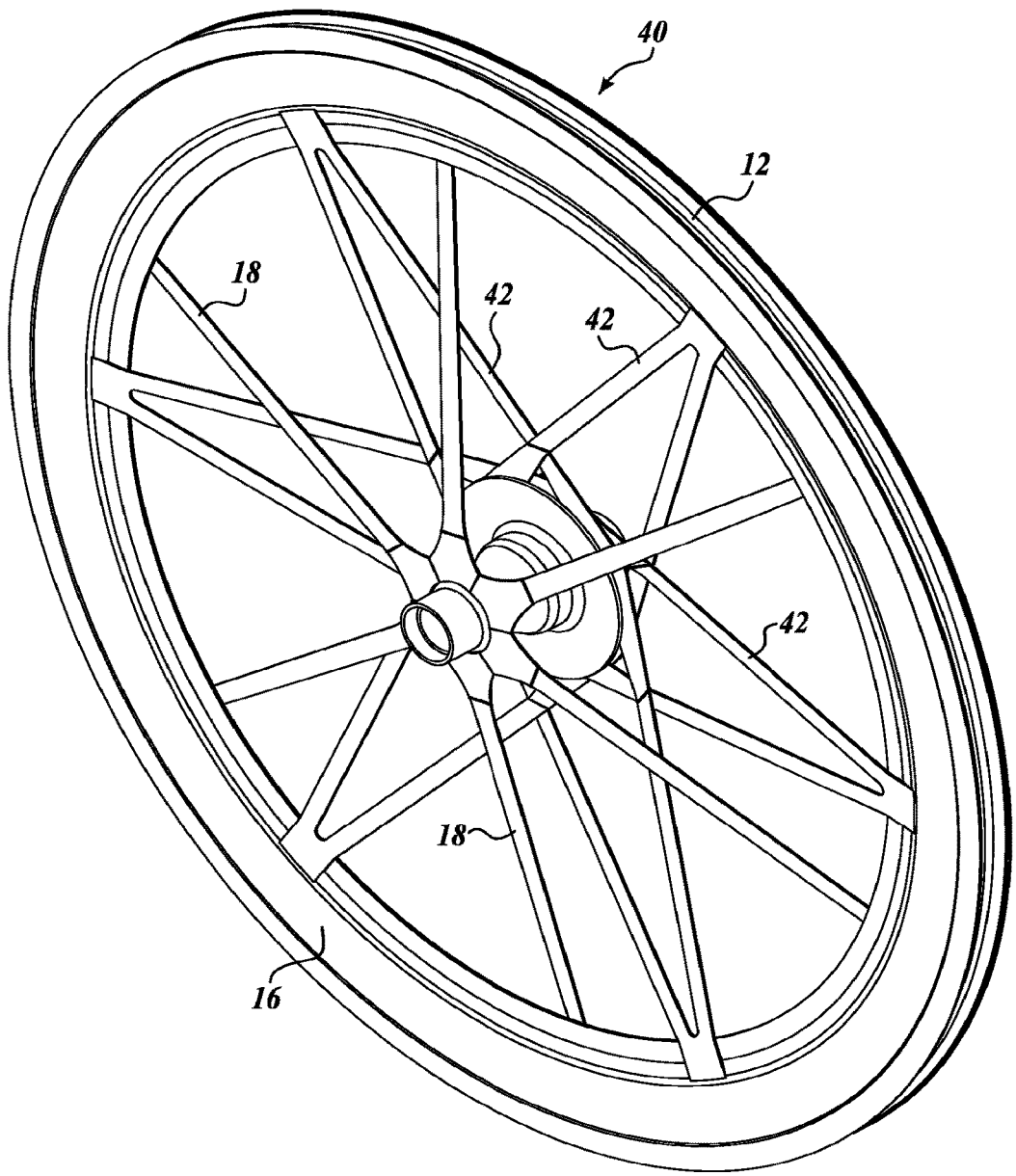
FIG. 9 is a left side perspective view of the bicycle wheel of FIG. 8.
Figure 10:
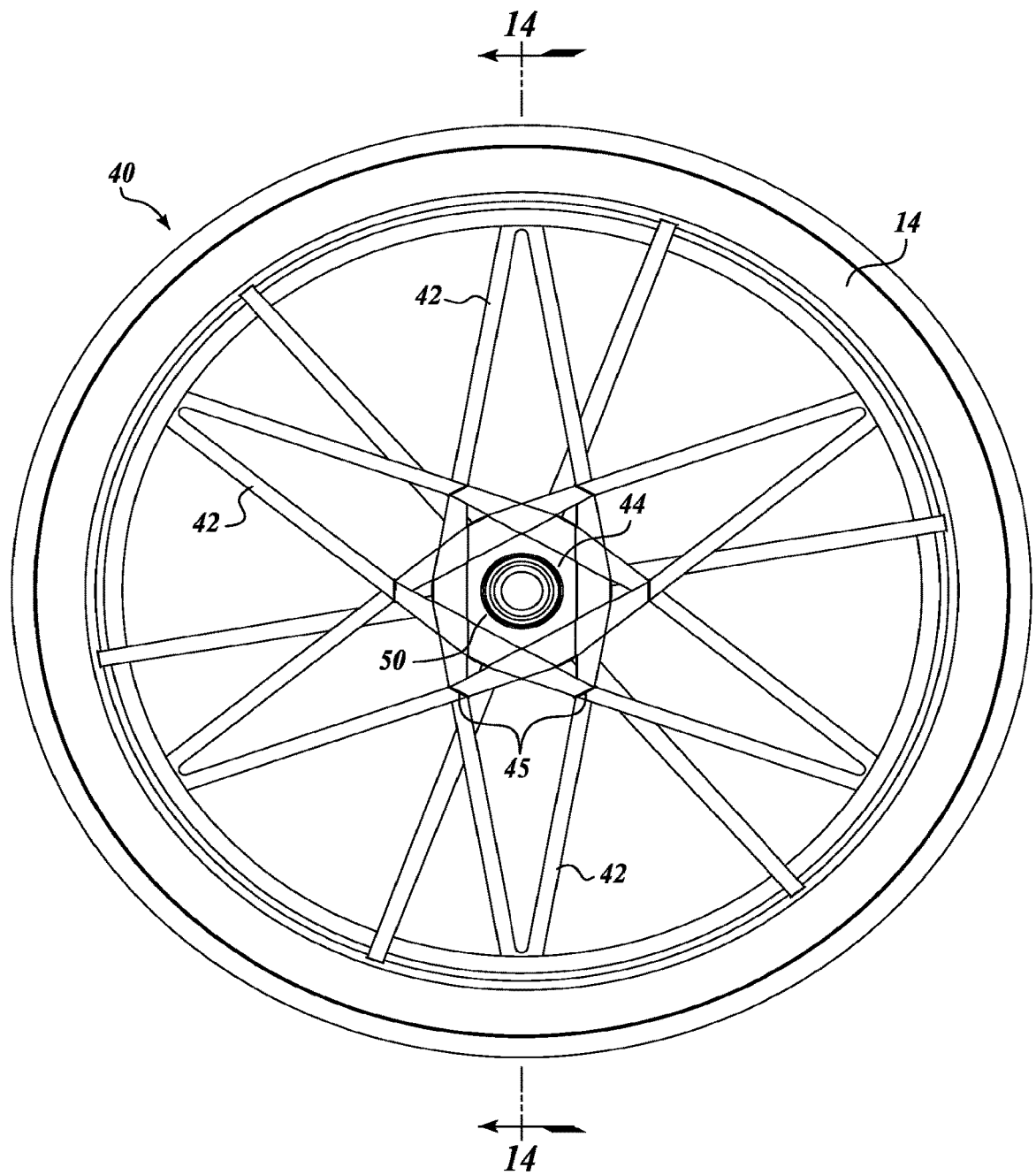
FIG. 10 is a right side elevation view of the bicycle wheel of FIG. 8.

Turning now to FIGS. 8-10, a rear bicycle wheel 40 is disclosed to comprise a left-hand side as best seen in FIG. 9 which is of like configuration to the front wheel sidewall and spoke configuration discussed above with respect to FIGS. 1-7. As best seen in FIGS. 8 and 10, the right side of the rear wheel employs a different form of wishbone-shaped spoke 42 (see FIG. 13 also), the inner ends 48 of which are bonded to each other and to the right side flange 44 of the rear wheel.

It will be understood that, except for the differences in the configuration of the rear hub and the rear right side spokes, the method of manufacture of the rear wheel 40 is basically the same as that of front wheel 10 as described above.

Figure 13:
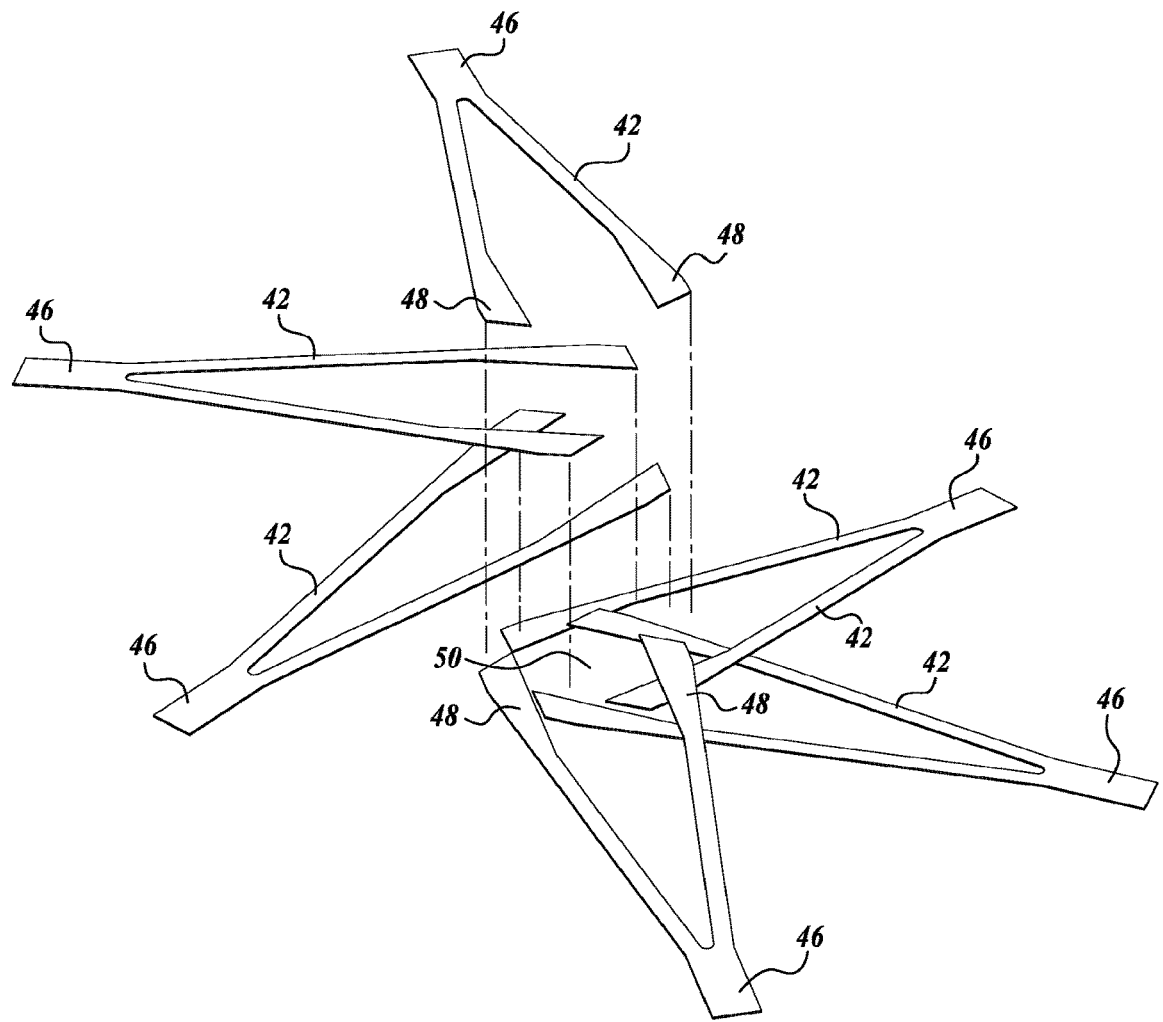
FIG. 13 is an exploded view of the spokes of the right side of the rear bicycle wheel of FIG. 8 showing the manner in which the spokes are bonded together.

As best seen in FIG. 13, wishbone-shaped spokes 42 include a flat outer portion 46 which extends through a slot 34 in the left side sidewall 16 and is bonded to the inside of the sidewall in the manner discussed above with respect to the front wheel at FIG. 5. The inner diverging ends 48 of wishbone-shaped spokes 42 overlie each other as best seen in FIG. 13 and are bonded to define a hexagonal opening 50. The widened base of the spokes allows them to better carry shear loads resulting from the torque of the driven hub. The widened end may also be formed of fiber plies oriented at an angle to the length of the spoke to further strengthen the spoke/hub connection.

Figure 11:
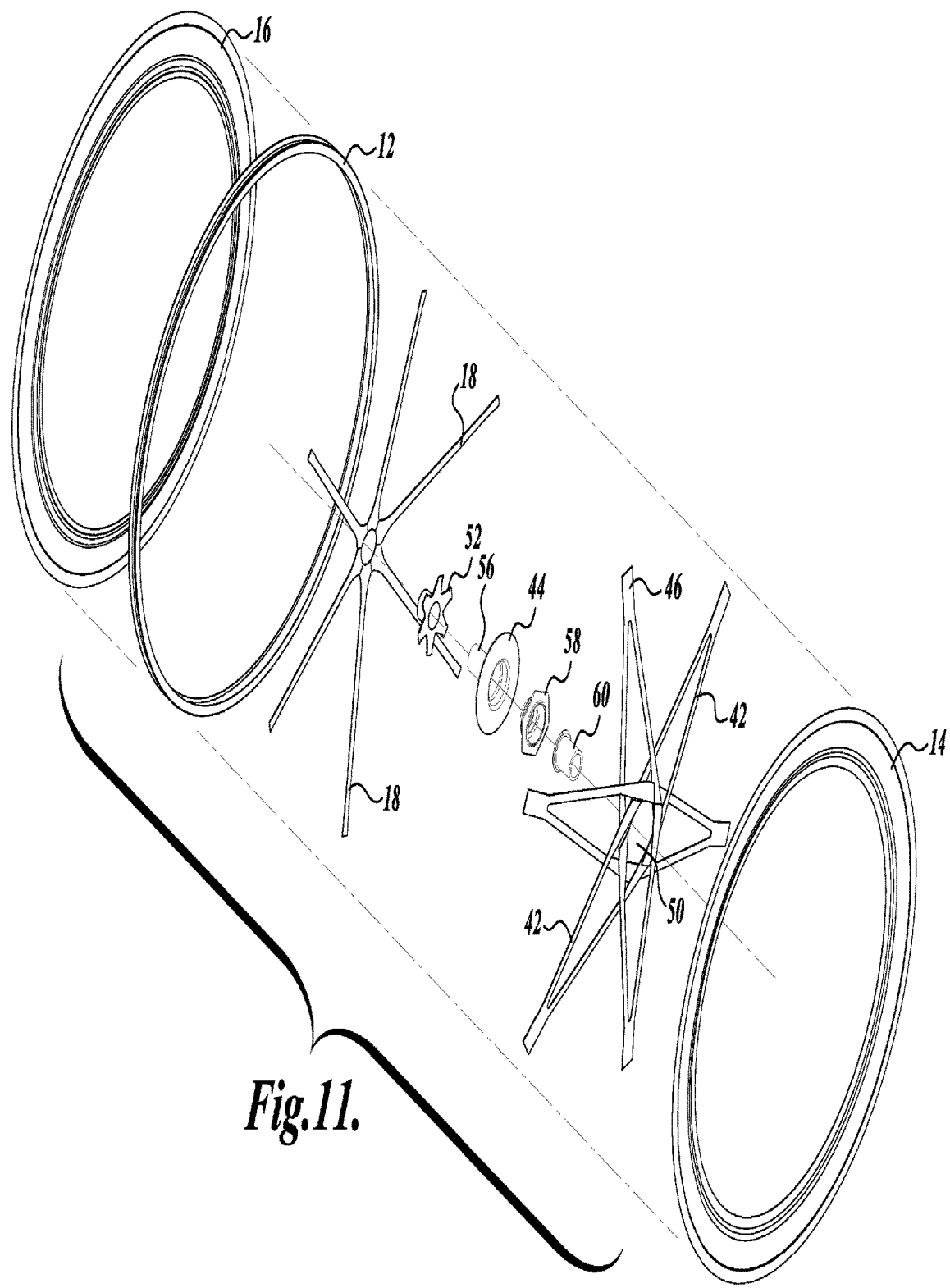
FIG. 11 is a right side exploded view of the bicycle wheel of FIG. 8.
Figure 12:
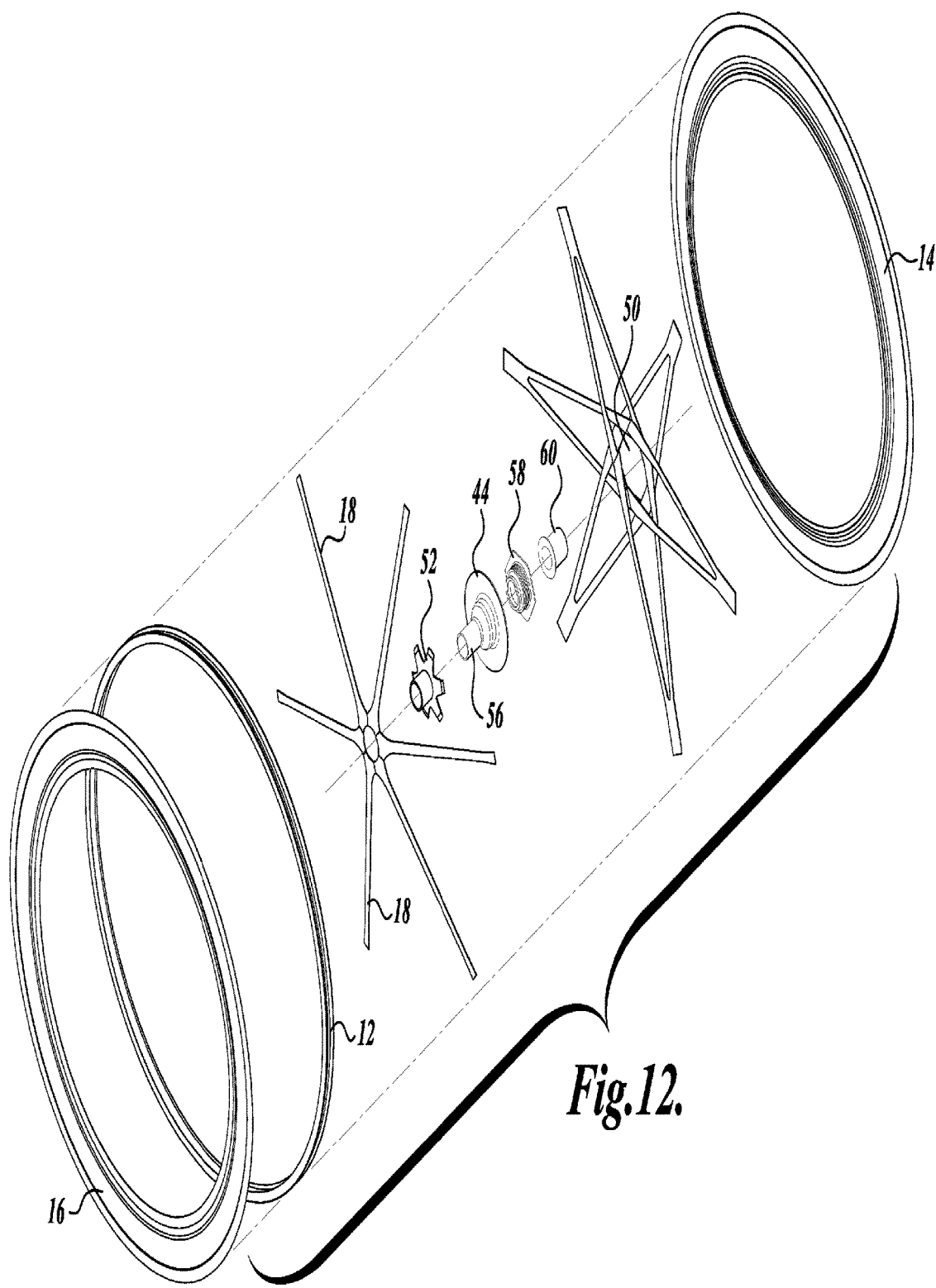
FIG. 12 is a left side exploded view of the bicycle wheel of FIG. 8.

Referring to FIGS. 11 and 12, the hub parts of the rear wheel are shown to include left side flange 52 and right side flange 44 which is shown formed to include inwardly extending tunnel 56 on which left side flange 52 is mounted as will be discussed hereafter. Mounted within the outer central opening of flange 44 are fitting 58 having a hexagonal outer surface and outwardly extending tube 60 which is adapted to receive a conventional free hub. The drive side right rear spokes 42 are shaped to accommodate the high torque forces transmitted to the right side of the rear wheel 40 as a result of pedaling forces transmitted through the chain connecting the front and rear sprockets of the bicycle on which the wheels are mounted. The bifurcated spokes are designed to withstand the high torque transfer forces and include large bond surfaces 46 and 48 that are oriented to best accommodate such forces. As mentioned earlier, the hexagonal opening 50, formed by the joining of the overlapping spokes 42, fits over the hexagonal outer edge of fitting 58 to form a mechanical connection, thus, additionally accommodating torque transfer from the hub through the spokes to the outer wheel.

As best seen in FIG. 13, the spoke pattern at the inner ends 48 of the spokes where they are joined together is formed in two layers, each spoke of a single layer spanning 120 degrees such that three spokes comprise a complete circular layer. The second layer of three spokes is offset 60 degrees from the first and is bonded on top of the first layer. The two-layer assembly is possible because of the flatness and width of the spokes and creates great strength in the final assembly.

Again, the front and rear wheels share the same fundamental design of a bonded structure made from simple shaped flat carbon fiber components. In the case of each component, pieces of carbon fiber pre-preg woven fabric or unidirectional carbon fiber tape are cut to pattern shapes. These fabric and tape pieces are laid up in conventional tools in precise order, direction, and layers and then cured in a vacuum and under pressure at high temperature. The cured components are then trimmed to shape, and the trimmed parts are assembled, bonded together with adhesives, and then temperature cured. Finally, as discussed hereafter, high tension is introduced to the final structure.

Figure 14:
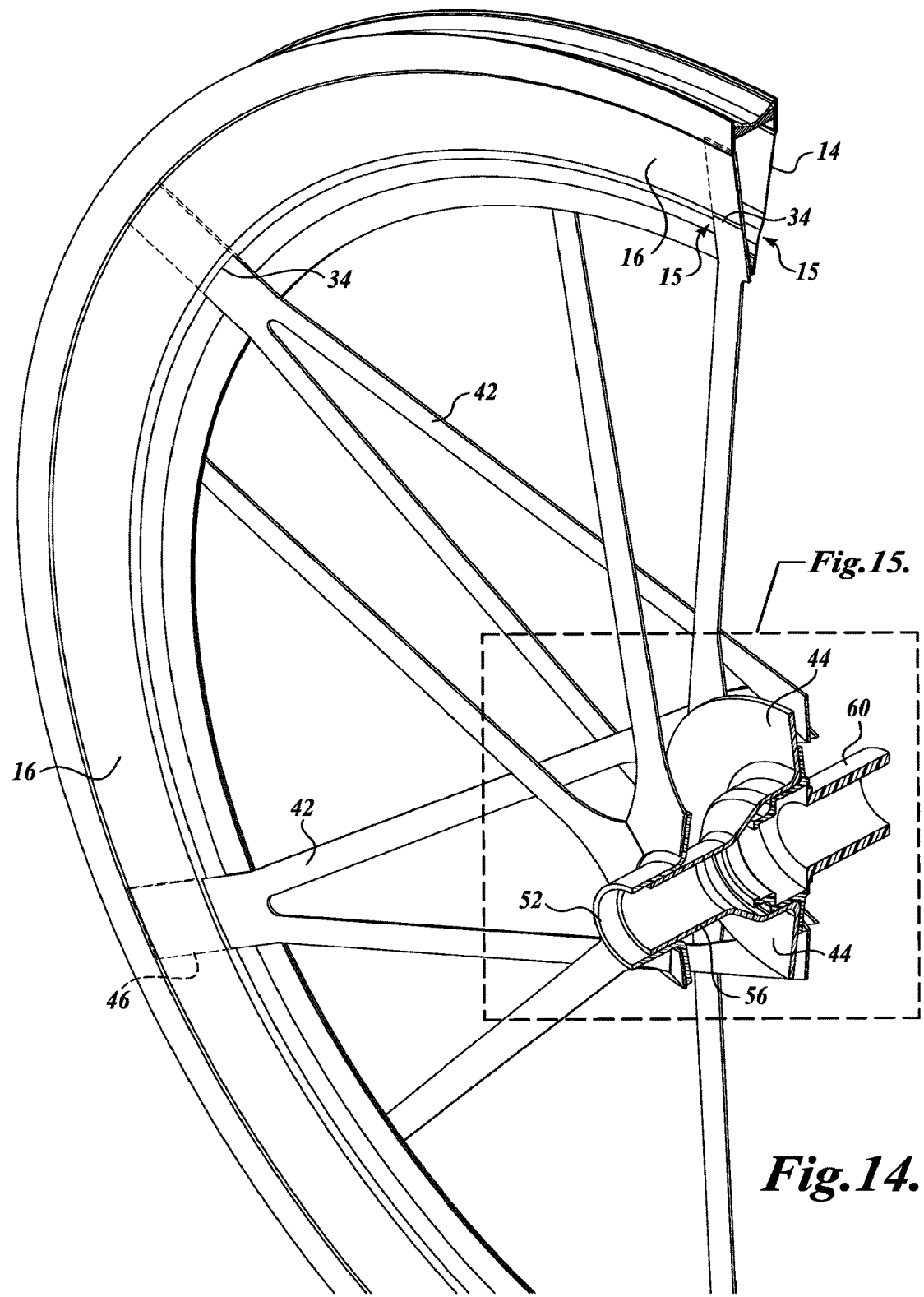
FIG. 14 is a section view taken along lines 14-14 of FIG. 10.
Figure 15A:
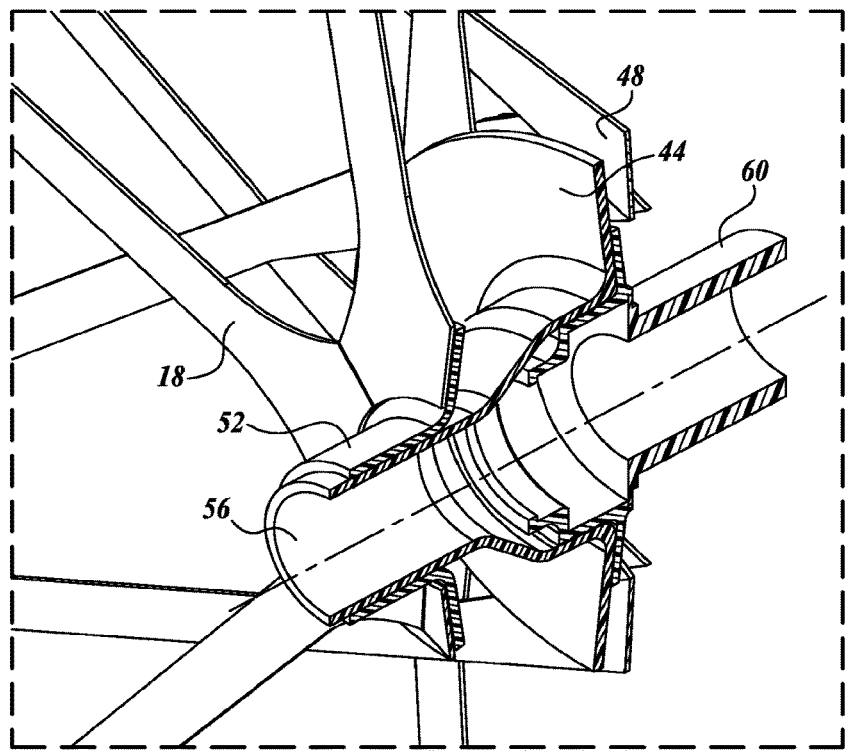
FIG. 15A is an enlarged view of the hub portion of the bicycle wheel of FIG. 14 showing the left side flange in its initial location.
Figure 15B:
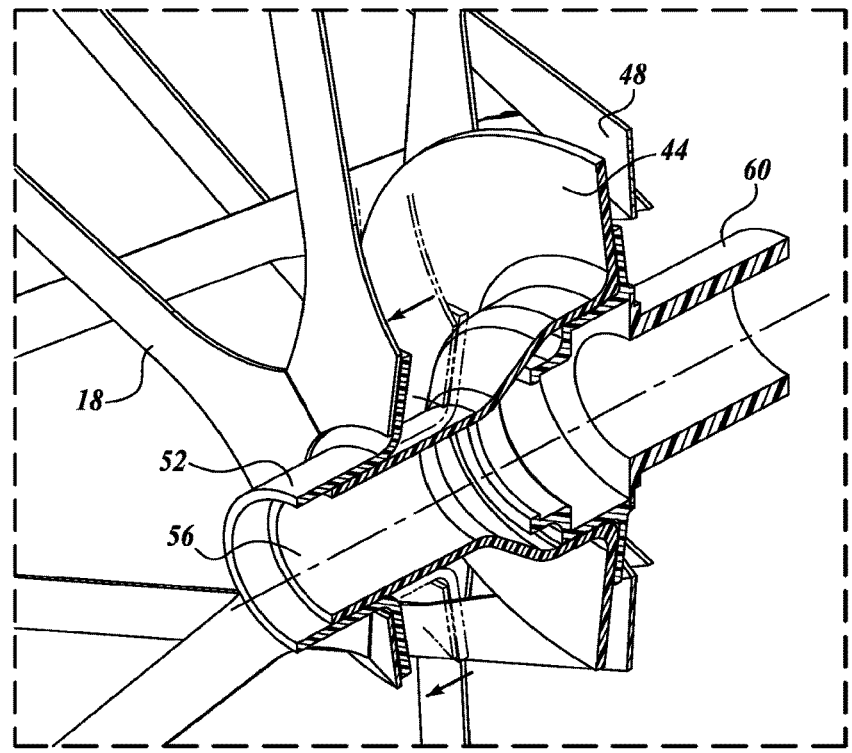
FIG. 15B is an enlarged perspective view of the hub of FIG. 14 showing the left side flange moved outwardly to tension the spokes of the wheel.

Turning now to FIGS. 14, 15A, and 15B, a sectional view of the rear wheel 40 and its central hub assembly with wheel flanges 44 and 52 mounted thereon.

As best seen in FIG. 15A, after assembly of all parts of the wheel, left side flange 52 is slipped over the end of tunnel 56 which, as stated above, is formed as a part of right side flange 44.

Referring additionally to FIG. 15B and in the manner discussed earlier with respect to the front wheel, tension is added to the spokes and wheel by moving right side flange 44 and left side flange 52 laterally apart and then bonding left side flange 52 to tunnel 56 to maintain the tension in the spokes and wheel. FIG. 15B shows the original position of flange 52 in phantom line, and arrow 62 illustrates the direction in which flange 52 is moved with respect to flange 44. It will be understood that the distance of movement shown in FIG. 15B is illustrative only and, in actuality, a relatively small movement is required to add high tension to the spokes and wheel structure.

As a final step, all spokes are lashed with high strength thread to prevent peel bond failure and increase durability and safety. The lashing 45 occurs around each spoke to hub bond for the front and left rear spokes. For the right rear spokes, the lashing ties spokes together as they cross on their path to the sidewall. In all cases, the lashing prevents spoke to hub bond failure in case the spoke would tend to be peeled away in an accident.

While certain embodiments have been illustrated and described, it will be appreciated that various changes can be made therein without departing from the spirit and scope of the invention.

The embodiments of the invention in which an exclusive property or privilege is claimed are defined as follows:

1. A carbon fiber bicycle wheel comprising:
   a rim having a center channel and first and second sides;
   first and second sidewalls bonded to the first and second sides of the rim;
   a plurality of flat spokes bonded to each of the sidewalls and extending inwardly toward first and second flanges, the flanges being laterally spaced from each other;
   the first and second flanges having at least one portion extending radially outward, the spokes bonded to the at least one portion,
   wherein the first flange is formed to include a laterally extending tube on which the second flame is laterally moveably mounted during construction such that tension in the spokes is created by moving the second flange laterally outward along the laterally extending tube, the tension in the spokes being maintained by bonding the second flange in place on the laterally extending tube.

2. The bicycle wheel of claim 1, wherein fibers of woven carbon fiber cloth run lengthwise along the spokes to carry tension loads from the flanges to the sidewalls.

3. The bicycle wheel of claim 1, wherein the first and second sidewalls are formed from pattern shapes of carbon fiber cloth;
arcuate segments of the pattern shapes partially overlapping each other to form a circular sidewall.

4. The bicycle wheel of claim 3, wherein the sidewalls are formed of layers of the arcuate segments, the layers being circumferentially offset with respect to each other.

5. A method of making a bicycle wheel comprising the steps of:
selecting a piece of woven carbon fiber cloth;
cutting pattern shapes from the cloth;
laying up the pattern shapes to form bicycle wheel parts including a rim, a pair of sidewalls, a first flange and a second flange, and a plurality of spokes;
curing the laid up bicycle wheel parts;
bonding the cured parts together with adhesive to form a wheel and curing the bonded parts;
joining the flanges in laterally spaced relation; and
moving the flanges laterally apart to create tension in the spokes; and
bonding the flanges to maintain the tension in the spokes, wherein:
joining the flanges in laterally spaced relation includes temporarily mounting the second flange on a laterally extending tube formed as part of the first flange;
moving the flanges laterally apart to create tension in the spokes includes moving the second flange laterally outward on the laterally extending tube to create tension in the spokes; and
bonding the flanges to maintain the tension in the spokes includes bonding the second flange in place on the laterally extending tube to maintain the tension in the spokes.

6. The method of claim 5, wherein cutting pattern shapes from the cloth includes cutting the pattern shapes such that fibers of the woven carbon fiber cloth run lengthwise along the spokes to carry tension loads from the flanges to the sidewalls.

7. The method of claim 5, where cutting and laying up the pattern shapes to form a sidewall includes cutting arcuate segments and laying the segments end to end such that their ends overlap.

8. The method of claim 5, wherein the sidewall is formed of layers of the arcuate segments, the layers being circumferentially offset with respect to each other.

* * * * *